US012542345B2

(12) United States Patent
Alcesilas et al.

(10) Patent No.: US 12,542,345 B2
(45) Date of Patent: Feb. 3, 2026

(54) WIRELESS PASSIVE ELECTRONIC COMPONENT AND ASSOCIATED READING SYSTEM

(71) Applicant: Commissariat à l'énergie atomique et aux énergies alternatives, Paris (FR)

(72) Inventors: Romain Alcesilas, Grenoble (FR); Marc Sansa Perna, Grenoble (FR); Camille Jouvaud, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 290 days.

(21) Appl. No.: 18/347,952

(22) Filed: Jul. 6, 2023

(65) Prior Publication Data

US 2024/0014542 A1 Jan. 11, 2024

(30) Foreign Application Priority Data

Jul. 8, 2022 (FR) ..................................... 22 07029

(51) Int. Cl.
*H01Q 1/22* (2006.01)

(52) U.S. Cl.
CPC ................................ *H01Q 1/2225* (2013.01)

(58) Field of Classification Search
CPC .......... H01Q 1/2225; H01Q 5/40; H01Q 7/00; H01Q 23/00
USPC ........................................................... 340/1.1
See application file for complete search history.

(56) References Cited

U.S. PATENT DOCUMENTS

| | | | | |
|---|---|---|---|---|
| 6,667,725 B1* | 12/2003 | Simons | H01Q 7/005 343/866 |
| 10,911,078 B1* | 2/2021 | Wentzloff | H03B 5/1265 |
| 2007/0171074 A1* | 7/2007 | Camp | G08B 13/2417 340/572.7 |

(Continued)

OTHER PUBLICATIONS

French Preliminary Search Report issued Feb. 6, 2023 in French Application 22 07029 filed on Jul. 8, 2022, 3 pages (with English Translation of Categories of Cited Documents).

(Continued)

*Primary Examiner* — Omar Casillashernandez
(74) *Attorney, Agent, or Firm* — Oblon, McClelland, Maier & Neustadt, L.L.P.

(57) ABSTRACT

A passive wireless electronic component (2) including at least one antenna (14), the or each antenna having an associated antenna frequency, and comprising at least one resonant micro-electromechanical component having a resonant frequency and connected to a contact point of said antenna, forming an antenna-resonator assembly suitable for receiving an incident electromagnetic signal ($S_i$) including at least two frequencies and for transmitting a backscattered electromagnetic signal ($S_r$). The passive wireless electronic component (2) is such that the or each antenna (14) includes at least two non-linearly actuated resonant micro-electromechanical MEMS components (16, 18), each of said MEMS components having a natural mechanical resonant frequency thereof within a resonant frequency range, the resonant frequency ranges associated with two distinct MEMS components being disjointed.

13 Claims, 10 Drawing Sheets

(56) References Cited

U.S. PATENT DOCUMENTS

| | | | | |
|---|---|---|---|---|
| 2008/0238684 | A1* | 10/2008 | Tuttle | G06K 19/07749 340/572.7 |
| 2010/0255274 | A1* | 10/2010 | Mirsky | C25D 11/16 428/209 |
| 2013/0336095 | A1* | 12/2013 | Seppa | H04B 11/00 367/137 |
| 2016/0211826 | A1* | 7/2016 | Abdolvand | H03H 9/02244 |
| 2017/0040665 | A1* | 2/2017 | Takashima | H01Q 1/2291 |
| 2018/0365549 | A1* | 12/2018 | Nikitin | H01Q 15/0006 |
| 2019/0229770 | A1* | 7/2019 | Khaleghi | H01Q 3/01 |

OTHER PUBLICATIONS

Alcesilas et al., "Design of a MEMS-Based Fully Passive Wireless Pressure Sensor for Harsh Environments" 2022 Smart Systems Integration (SSI), IEEE, 2022, 4 pages.

* cited by examiner

WIRELESS PASSIVE ELECTRONIC COMPONENT AND ASSOCIATED READING SYSTEM

This application claims priority to French Patent Application No. 22 07029 filed Jul. 8, 2022, the entire disclosure of which is incorporated by reference herein.

FIELD OF THE INVENTION

The present invention relates to a passive wireless electronic component and an associated reading system.

The invention belongs to the field of passive electronic components, and more particularly passive electronic sensors and resonators.

BACKGROUND OF THE INVENTION

A passive wireless electronic component is a component which does not comprise any power source or any power rectifier. Such a component is also called a remotely powered component.

In a known manner, sensors are electronic or electromechanical components suitable for measuring a physical quantity, e.g. temperature, pressure, relative humidity, etc.

Various types of remote-powered passive sensors have been developed, such sensors having the advantage of functioning without an integrated energy source, which makes it possible to make same usable in difficult environments, e.g. in installations operating at high temperatures.

In the prior art, there is a plurality of families of passive wireless sensors, including LC resonant circuit sensors, acoustic wave sensors and electromagnetic transduction sensors.

LC resonant circuit sensors are based on a capacitive sensor in series or in parallel with an inductive loop, forming a resonant circuit. The resonant frequency of the circuit is modified by the variation in capacitance of the sensor depending on the physical quantity to be measured. Such resonant circuit sensors have the disadvantage of a small reading distance of less than 10 cm.

Acoustic wave sensors include a Surface Acoustic Wave (SAW) or a Bulk Acoustic Wave (BAW) sensor, powered by an antenna which is remotely powered. Such type of sensor has losses due to the double conversion between acoustic wave and electromagnetic wave, but also, in particular, to the propagation of the acoustic wave.

Electro-magnetic transduction sensors combine a sensor with an antenna, which supplies power to the sensor, the electromagnetic signal transmitted (or backscattered) by the antenna in response to an incident electromagnetic signal being used for determining a measured physical quantity value, the properties of the backscattered electromagnetic signal being modified according to the sensor. Such electromagnetic transduction sensors have the drawback of the sensitivity of the antenna to the external environment. For example, the temperature can vary the permittivity of the substrate on which the antenna is printed, and modify the resonant frequency of the antenna, and hence induce an imprecision in the measured value of the physical quantity considered.

The patent EP 2 478 636 B1, entitled “Wireless MEMS sensor and method of reading the same” describes an electronic component, typically a sensor, including an assembly formed by an antenna and a micro-electromechanical system (MEMS) resonator connected to the antenna, which makes it possible to carry out a reading of a physical quantity measured depending on the resonance frequency of the MEMS resonator, by an intermodulation technique. The MEMS resonator is characterized by two parameters, the mechanical quality factor and the mechanical resonance frequency, the antenna having an electrical resonance frequency, and at least one of said three parameters being sensitive to the measured physical quantity. The intermodulation voltage is used for generating an oscillation of the MEMS resonator in response to incident electromagnetic energy, at two different frequencies. Although more robust with respect to environmental conditions than an antenna, such an MEMS resonator can, nevertheless, also be impacted by environmental conditions, and, as a result, provide an imprecise physical quantity measurement. In addition, in such technology, the radio frequency antenna is a single antenna suitable for the MEMS resonator, in other words the limitation of a single MEMS resonator per antenna is imposed, which results in a considerable bulk when a plurality sensors are required.

The goal of the invention is to overcome the drawbacks of the prior art by providing a passive electronic component of limited size and/or better accuracy for measuring a physical quantity.

SUMMARY OF THE INVENTION

To this end, the invention proposes, according to one aspect, a passive wireless electronic component comprising at least one antenna, the or each antenna having an associated antenna frequency, and comprising at least one resonant micro-electromechanical component, having a resonant frequency and being connected to a contact point of said antenna, forming an antenna-resonator assembly suitable for receiving an incident electromagnetic signal including at least two frequencies and for transmitting a backscattered electromagnetic signal. The electronic component is such that the or each antenna includes at least two non-linearly actuated resonant micro-electromechanical components, MEMS, each of said MEMS components having a natural mechanical resonance frequency thereof belonging to a range of resonance frequencies, the resonant frequency ranges associated with two distinct MEMS components being disjointed.

Advantageously, the proposed passive wireless electronic component includes at least two micro-electromechanical, components, MEMS, resonant on the same antenna, the resonant frequencies of the two resonant MEMS components belonging to disjoint areas, which allows the responses to be differentiated of the resonant MEMS components to an incident electromagnetic signal having selected frequencies.

The passive wireless electronic component according to the invention can further have one or a plurality of the features below, taken independently or according to all technically feasible combinations:

Same comprises a number N of antennas, N being greater than or equal to two, each antenna including at least two non-linearly actuated resonant micro-electromechanical MEMS components, each antenna having a natural antenna frequency thereof, the antenna frequencies of two distinct antennas being different.

At least one of the at least two resonant MEMS components is a capacitive resonator.

At least one of the at least two resonant MEMS components is a resonant MEMS sensor the resonant frequency of which varies according to a predetermined physical quantity.

The predetermined physical quantity is a physical quantity characteristic of an environment of the resonant MEMS sensor, among temperature, air or gas pressure, relative humidity.

The passive wireless electronic component includes a plurality of resonant MEMS sensors, each of said resonant MEMS sensors having a resonant frequency varying according to a distinct physical quantity, said passive electronic component being suitable for providing measurements of a plurality of distinct physical quantities.

The passive wireless electronic component includes at least one pair of first and second resonant MEMS components, the first MEMS component being a resonant MEMS sensor the resonant frequency of which varies according to a first physical quantity to be measured and according to at least a second physical quantity, the second MEMS component of said pair being a resonant MEMS sensor the resonant frequency of which not vary according to said first physical quantity, the resonant frequency of the second sensor varying according to said at least one second physical quantity.

The at least two resonant MEMS components are connected in series or in parallel.

Said at least one antenna is produced as a printed circuit on a substrate and said MEMS components are produced on one or a plurality of silicon chips, each MEMS component being connected to an antenna element by wire bonding.

Said antenna and said at least two resonant MEMS components are implanted on the same silicon substrate.

Each resonant MEMS component consists of a membrane positioned between two electrodes, with circular shape and having an associated radius.

According to another aspect, the subject matter of the invention is a system for reading a passive wireless electronic component of the type briefly described hereinabove, the system including a passive wireless electronic component and a device for transmitting and analyzing electromagnetic signals, configured for transmitting said incident electromagnetic signal to the passive electronic component and for receiving and analyzing the backscattered electromagnetic signal.

The reading system has advantages similar to the advantages of the passive wireless electronic component.

According to one embodiment, the transmission and analysis device includes a module generating an electrical signal and an antenna for transmitting and reading an incident electromagnetic signal, the transmission and reading antenna being further suitable for receiving the electromagnetic signal backscattered by the antenna of the passive electronic component, the transmission and analysis device further including a signal processing module configured for analyzing the frequency characteristics of the backscattered electromagnetic signal.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION OF EMBODIMENTS

Figure 1:
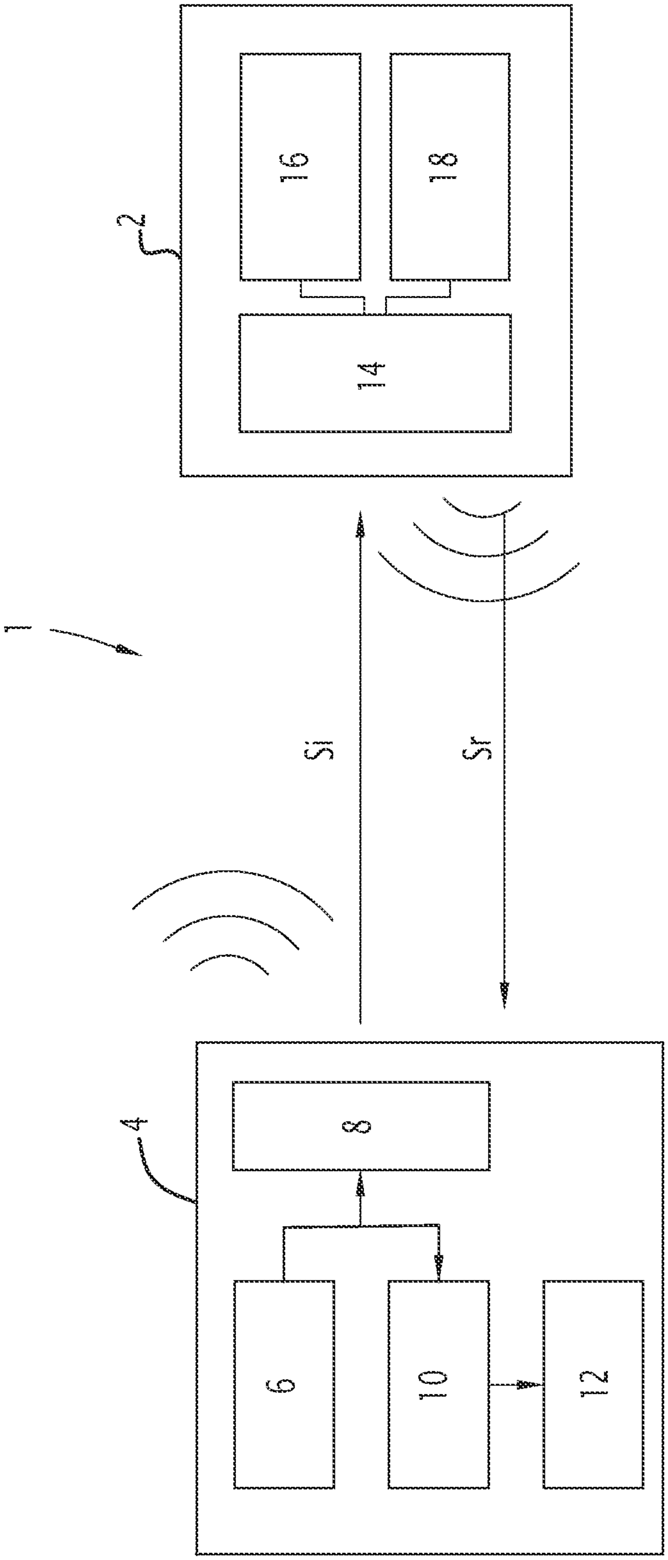
FIG. 1 is a function schematic view of a system comprising an electronic component according to one embodiment.

FIG. 1 schematically shows, by function modules, a reading system 1 of a passive wireless electronic component according to one embodiment.

The system 1 includes a passive wireless electronic component 2, a plurality of detailed embodiments of which will be described hereinafter, and a device 4 for transmitting and analyzing electromagnetic signals associated with the passive wireless electronic component.

The device 4 includes a module 6 generating an electrical signal and a transmission and reading antenna 8.

According to a variant (not shown), the device 4 includes two distinct antennas, a transmission antenna and a reading antenna.

The electrical signal is transformed into an incident electromagnetic signal $S_i$, also called an incident electromagnetic wave, transmitted by the transmission and reading antenna 8. The incident electromagnetic signal $S_i$ comprises at least two frequencies, as described in greater detail hereinafter.

The transmission and reading antenna 8 is further suitable for receiving an electromagnetic signal $S_r$ backscattered by the antenna 14 of the passive wireless electronic component 2.

The transmission and reading antenna 8 is connected to a signal processing module 10, implementing a plurality of signal processing functions, including an analysis of the frequency characteristics of the backscattered electromagnetic signal $S_r$.

The device 4 further includes a calculation module 12 which uses the frequency characteristics obtained, for providing a result, e.g. a measured value of a physical quantity or a plurality of values of a measured physical quantity.

The modules 6, 10, 12 are electronic modules.

For example, the module 12 is a computing processor or a microcontroller.

The passive electronic component 2 is a wireless component including at least one antenna 14, to which are connected at least two micro-electromechanical components, referred to hereinafter as MEMS, which are resonant components with non-linear actuation each having a natural mechanical resonance frequency (also called eigenfrequency of mechanical resonance).

For example, the dimensions of the antenna 14 are millimetric, on the order of several millimeters in length and width or diameter depending on the geometry of the antenna. The MEMS components have micro-metric dimensions.

For the same antenna, the mechanical resonance frequency of one of the MEMS components is strictly different from the mechanical resonance frequency of another MEMS component positioned on said antenna.

In other words, each MEMS component of the same antenna has a natural mechanical resonance frequency, hereinafter called natural resonance frequency, belonging to a range of resonance frequencies, the ranges of resonance frequencies associated with the two distinct MEMS components being disjoint.

A range of frequencies [f_min, f_max] is called a range of resonant frequencies associated with a MEMS component, the natural resonant frequency $f_m$ belonging to the range [f_min, f_max].

Two respective resonant frequency ranges, [f1_min, f1_max] and [f2_min, f2_max], are called disjoint when the lowest upper frequency limit of one of the frequency ranges, e.g. f1_max, is strictly lower than the lower frequency limit, e.g. f2_min, of the other frequency range.

The antenna 14 is suitable for receiving in a frequency band called antenna passband, $[F_a \pm \Delta]$ where $F_a$ is the electrical resonance frequency of the antenna, hereinafter called antenna frequency.

For example, the antenna 14 is suitable for functioning in a frequency band belonging to the frequency band between 300 MHz and 3 GHz, also called UHF band. Non-linearly actuated resonant component means a component, the actuation force of which is proportional to an electrical parameter (e.g. actuation voltage), more particularly proportional to an electrical parameter squared. The component will then be actuated at the intermodulated frequencies of the electrical actuation signal. For example, if the electrical signal is $S_e = A_1 \cos 2\pi f_1 + A_2 \cos 2\pi f_2$, the actuation force will be proportional to $S_e^2$ and hence $F_e$ $$\propto \frac{A_1 A_2}{2} \cos 2\pi(f_1 + f_2) + \frac{A_1 A_2}{2} \cos 2\pi(f_1 - f_2).$$

In the embodiment illustrated in FIG. 1, the passive wireless electronic component 2 includes an antenna 14, to which are connected, a first non-linear actuation resonant MEMS component 16 and a second non-linear actuation resonant MEMS component 18.

In one embodiment, the MEMS components 16 and 18 are placed on the antenna 14, each being connected to the antenna 14 at a contact point.

According to one embodiment, each of the resonant MEMS components 16, 18 is connected to the antenna 14 to the same contact point.

According to another embodiment, each of the resonant MEMS components 16, 18 is connected to the antenna 14 at a distinct contact point.

The resonant MEMS components 16, 18 are connected in parallel or in series.

In one embodiment, the antenna is produced on a substrate in the form of a printed circuit, and each MEMS component is made on a silicon chip, the MEMS components being connected to the antenna by means of wire bonding connections.

In an alternative embodiment, the antenna 14 and the connected MEMS components are produced on the same silicon substrate.

Figure 2:
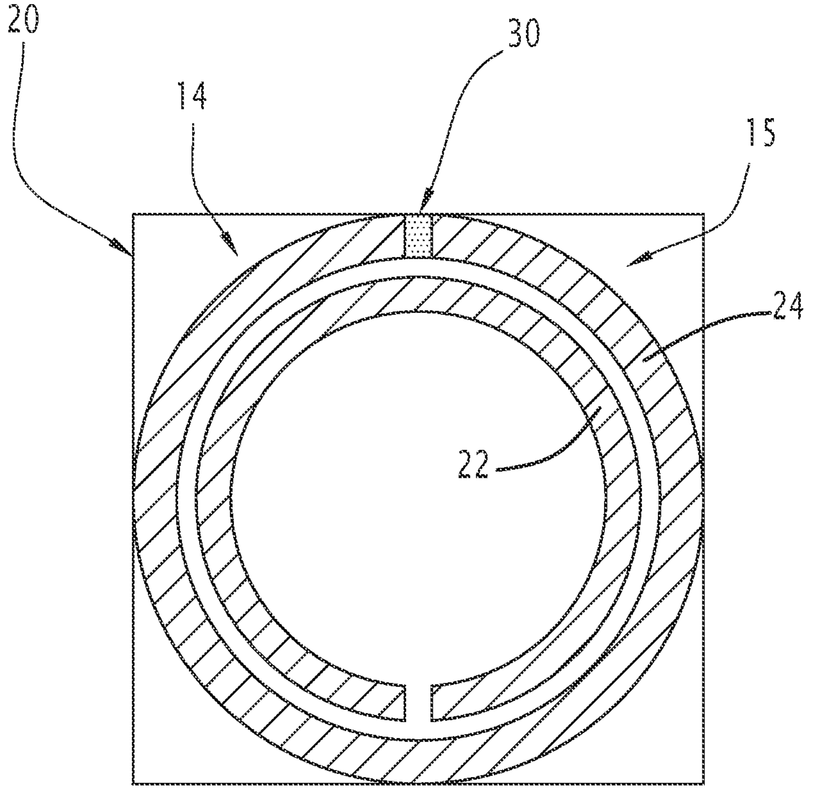
FIG. 2 illustrates a bottom view of a first embodiment of an electronic component.

In the example shown in FIG. 2, the passive wireless electronic component 2 includes an antenna 14.

In an alternative embodiment, the passive wireless electronic component 2 includes a number N of antennas, N being greater than or equal to two, each including at least two non-linearly actuated resonant MEMS, micro-electromechanical components, each antenna having an own natural antenna frequency thereof which is different from the antenna frequency of each of the other N-1 antennas.

More generally, each antenna includes a number P of resonant MEMS components with non-linear actuation, P being greater than or equal to 2.

In one embodiment, each of the MEMS components 16, 18 is a capacitive resonator.

In one embodiment, at least one of the resonant MEMS components is a resonant MEMS sensor having a mechanical resonant frequency which varies according to a predetermined physical quantity, such as a capacitive MEMS sensor.

For example, the physical quantity is temperature, air or gas pressure, relative humidity.

In the reading system of a passive wireless electronic component 2, the incident electromagnetic signal $S_i$ includes at least two close frequencies, a first frequency $f_e$ and a second frequency $f_e + f_m$, respectively, the two frequencies being in the passband of the antenna 14. By adjusting the second frequency with respect to the first frequency, one or other of the resonant MEMS components 16, 18 of the antenna is brought into resonance, the resonance modulating the amplitude of the electromagnetic signal $S_r$ backscattered by the antenna.

By investigating, by scanning a set of frequencies fin, the spectral characteristics of the backscattered electromagnetic signal, it is determined for which second frequency $f_e + f_m$ of the incident electromagnetic signal $S_i$, the amplitude of the modulation of the backscattered electromagnetic signal $S_r$ varies the most. Thereby, the device 4 detects the resonant frequency at which one of the resonant MEMS components of the antenna resonates.

Since the resonant frequency ranges of the MEMS components of the electronic component are disjoint, reading makes it possible both to distinguish which resonant MEMS component of the antenna 14 is in resonance and to detect the resonant frequency thereof.

When the resonant MEMS component is a resonant MEMS sensor, e.g. a capacitive sensor, the mechanical resonance frequency of which varies with a given physical quantity, a value of the physical quantity considered is deduced therefrom by the computation module 12.

Thereby, advantageously, in one embodiment, the passive wireless electronic component 2 comprises a plurality of distinct capacitive MEMS sensors, the different sensors each having a mechanical resonance frequency varying with a distinct physical quantity. In this way, it is possible to measure a plurality of values of distinct physical quantities, while limiting the bulk of the component 2.

A first embodiment of an electronic component 20 is described with reference to FIGS. 2 and 3.

FIG. 2 shows a view, called a bottom view, of the component 20, the component including a planar antenna 14 including two nested radiating loops 22, 24, and a set 30 of MEMS components.

The antenna 14 is e.g. produced in the form of a conductive track printed on a substrate 15, e.g. by a PCB manufacturing technology.

Figure 3:
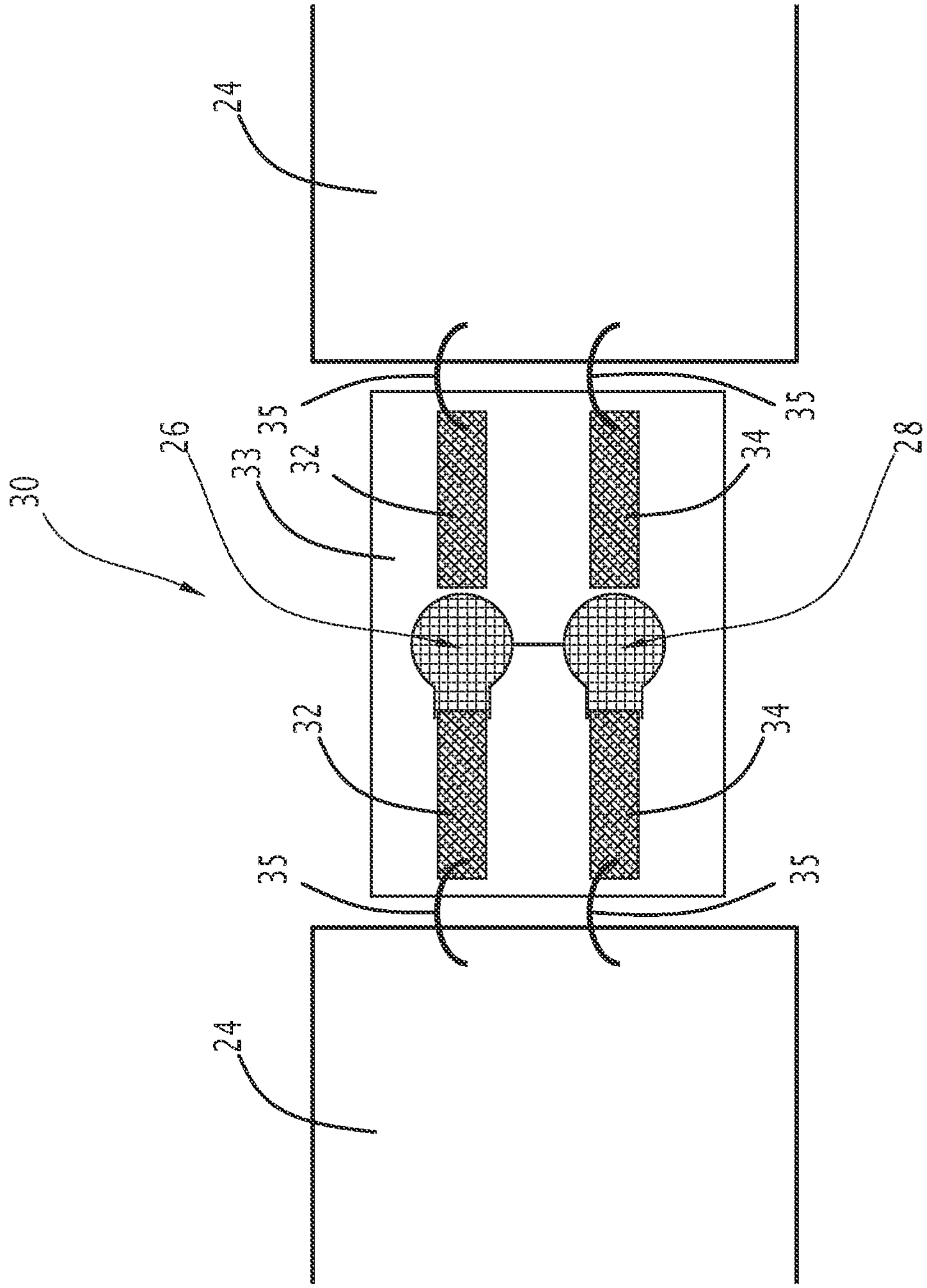
FIG. 3 schematically represents a section through the MEMS components according to one embodiment.

The assembly 30 includes, in said example, two MEMS components 26, 28, which are e.g. circular membrane capacitive MEMS sensors, connected in parallel and represented schematically in FIG. 3.

As illustrated in FIG. 3, each MEMS sensor 26, 28 is placed on a silicon substrate 33, and is connected to the radiating loop 24 via conductive tracks 32, 34 and wire bonding 35.

As an example, but not limited to, the set 30 is formed on a substrate 33, with parallelepipedal shape, with a rectangular base of millimetric dimensions, e.g. 1.1 mm wide and 1.7 mm long.

In such embodiment, each of the two MEMS sensors 26, 28 is composed of a circular silicon membrane, separated from a fixed electrode by a vacuum cavity of given thickness go, preferentially between 1 and 7 micrometers (m), e.g. equal to 2.5 m.

In said example, the electronic component has the function of a pressure sensor, the first MEMS sensor 26 being a sensor configured for measuring pressure, the second MEMS sensor 28 being a reference sensor, used for refining the pressure measurement as a function of temperature. The two MEMS sensors 26, 28, simply called sensors 26, 28 hereinafter, form a pair composed of a measurement sensor and a reference sensor.

The first sensor 26 is a capacitive pressure sensor, which, furthermore, is sensitive to temperature.

The second sensor 28 of the embodiment of FIG. 2 is a so-called reference sensor, of the same type as the first sensor 26, but the mechanical resonance frequency of which does not vary with the pressure.

For example, in one embodiment, the membrane of the second sensor 28 is perforated, which makes same insensitive to pressure. The other characteristics of the second sensor, e.g. the surface of the membrane and the material from which the membrane is made, are identical to the characteristics of the first sensor.

Figure 4:
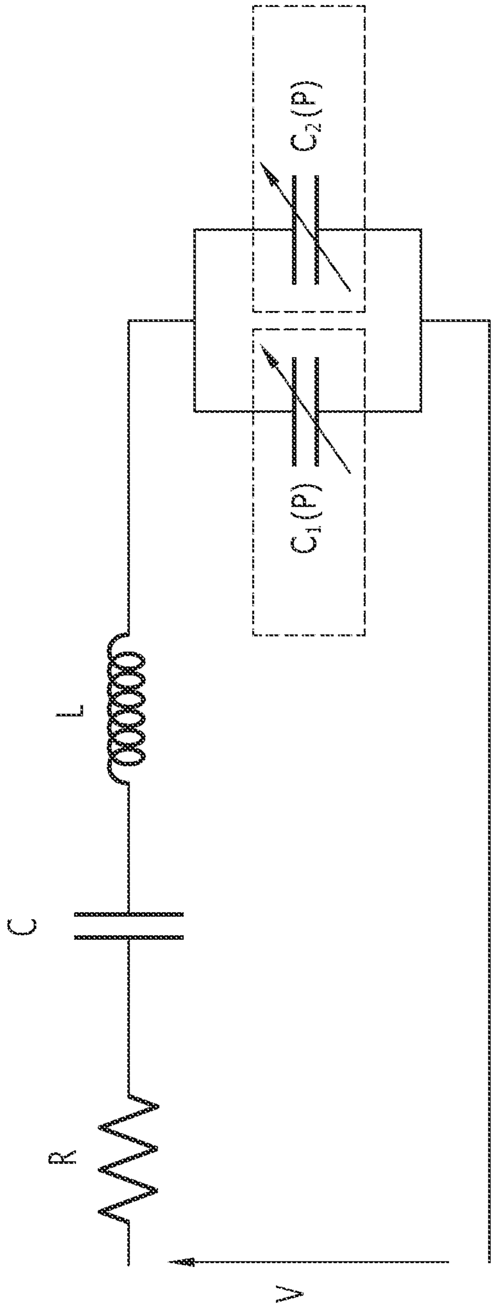
FIG. 4 shows an electrical circuit equivalent to the electronic component in the first embodiment.

An equivalent electrical circuit of the electronic component forming an antenna-sensor system of FIG. 2 is illustrated in FIG. 4.

The electrical functioning of the antenna is considered equivalent to a series RCL circuit, the respective values of resistance R, capacitance C and inductance L being dependent on the electromagnetic characteristics of the antenna.

The first sensor 26 has a capacitance $C_1(P,T)$ which varies as a function of pressure and temperature, and the second sensor 28 has a capacitance $C_2(T)$ which varies as a function of temperature.

Figure 5:
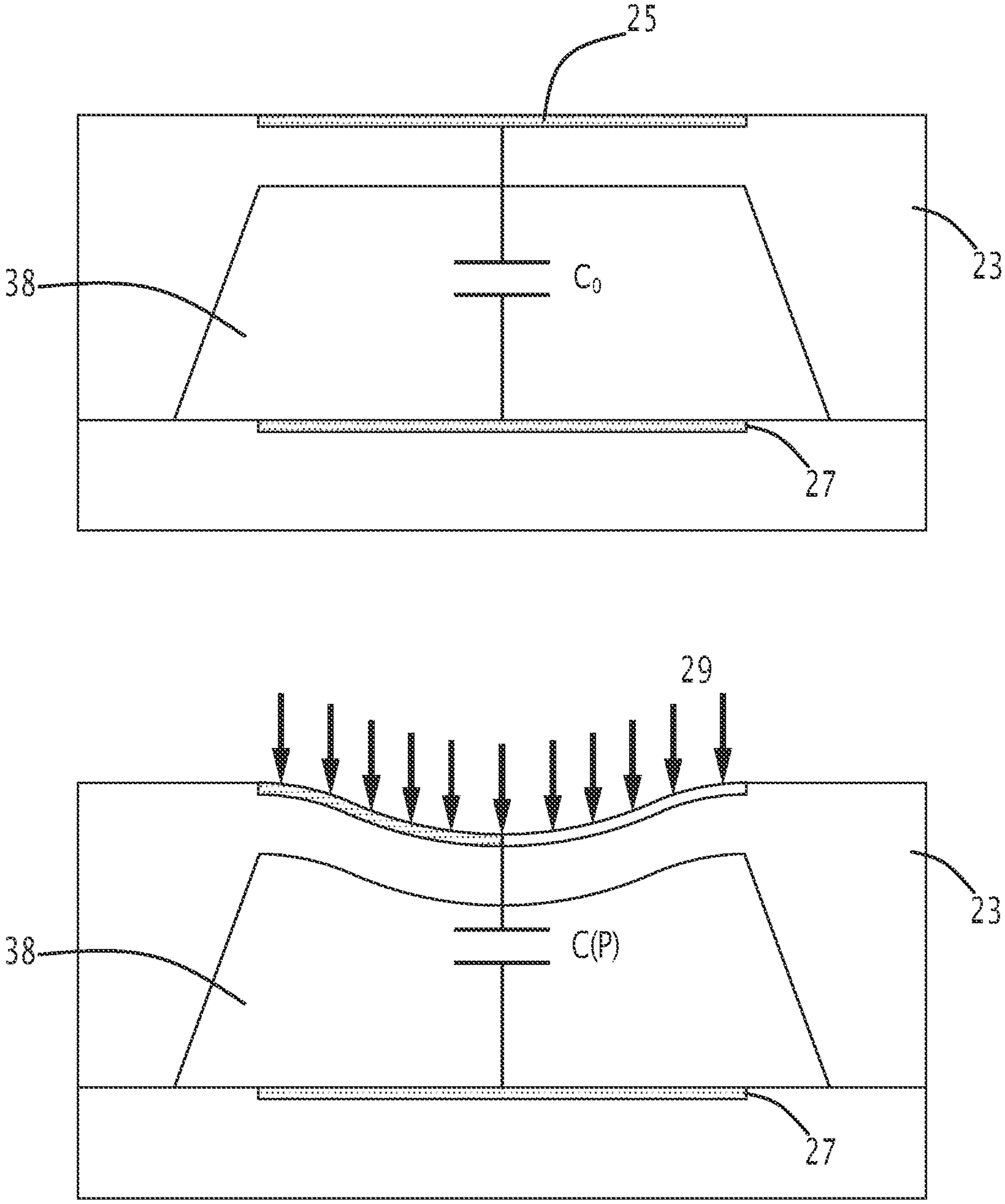
FIG. 5 schematically illustrates the variation of capacitance according to pressure for a resonant MEMS membrane sensor.
Figure 6:
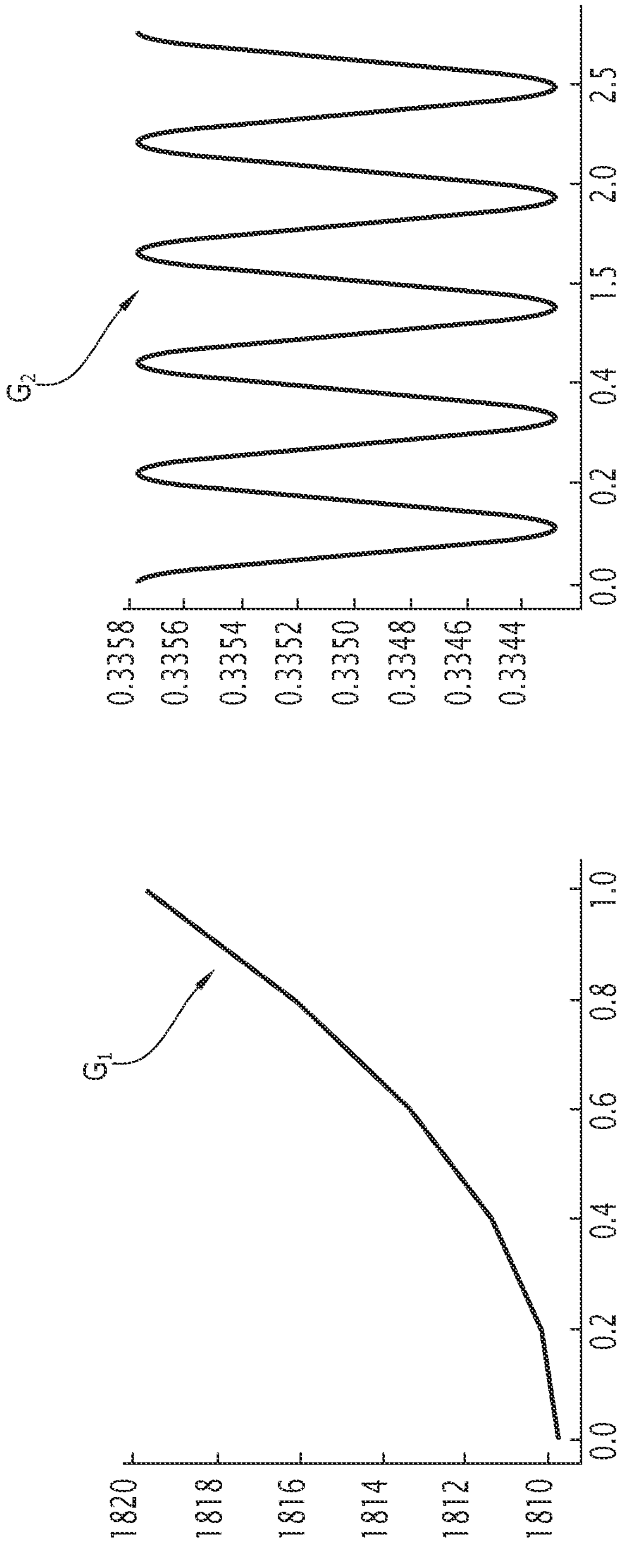
FIG. 6 shows operating graphs associated with the MEMS resonant membrane sensor.

FIGS. 5 and 6 illustrate the functioning of a membrane pressure MEMS sensor, e.g. of the first sensor 26, for a given temperature T.

The functioning of a membrane pressure sensor is illustrated schematically in FIG. 5, for a given temperature.

The membrane 23 is likened to a capacitive component of capacitance $C_0$ formed between two electrodes 25 and 27 when the membrane 23 is at rest, the membrane 23 being placed on a cavity 38, either empty or filled with air.

The external pressure (pressure of the environment of the sensor), schematically represented by arrows 29 in FIG. 4, makes the membrane deflect and modifies the capacitance C(P), where $C(0)=C_0$, between the two electrodes 25 and 27.

Associated functioning graphs, in one example of functioning, are illustrated in FIG. 6.

At a given temperature T, the resonance frequency of the first sensor 26 varies as a function of the pressure, between 0 bar and 1 bar.

An example of evolution is illustrated in graph G1 shown in FIG. 6, wherein the x-axis represents the pressure, with a variation between 0 bar and 1 bar, and the y-axis represents the resonance frequency of the membrane, between 1.810 MHz and 1.820 MHz.

The graph G2 shown in FIG. 6 illustrates the variation of the capacitance C(P) over time, the x-axis of the graph G2 representing the time between 0 and 2.5 s, the y-axis representing the capacitance C(P) in picofarads. The variation of the capacitance is sinusoidal in response to the incident electromagnetic signal $S_i$.

The variation in capacitance results in a variation in the backscattered electromagnetic signal over time, making it possible to detect the resonant frequency of the sensor membrane.

In the embodiment shown in FIG. 2, the vibrations of the second sensor 28 are independent of the pressure, but dependent on the temperature.

The resonance frequency of the second sensor 28 is a reference resonance frequency $f_{ref}$ dependent on the temperature T:

$$f_{ref}(T)=f_c(0,T)$$

Where T denotes the temperature, and $f_c$ is the resonance frequency of the first sensor 26, dependent on the pressure and the temperature. In other words, the resonance frequency of the second sensor is equal to the resonance frequency of the first sensor at a pressure equal to 0 bar and at the same temperature.

In an example of application, the given temperature is the ambient temperature, e.g. $T_0=20°$ C. For example, the resonant frequency of the antenna is $F_a=868$ MHz.

For example, the first resonant frequency $f_e$ of the first sensor 26 varies in the resonant frequency range 1.81 to 1.82 MHz and the second resonant frequency of the second sensor 28 varies in the resonant frequency range 1.02 to 1.07 MHz.

In said example, the antenna-sensor system is designed so that at 868 MHz, and at a pressure of zero bar, the strength of the electromagnetic backscattered signal sent by the antenna is maximum.

In one embodiment, the device 4 for transmitting and analyzing electromagnetic signals sends an electromagnetic signal $S_i$ of frequency 868 MHz, amplitude-modulated with a modulation frequency $f_m$ varying in the frequency range $[f_c(0,T); f_c(1,T)]$.

The frequency range $[F_a+f_c(0,T);F_a+f_c(1,T)]$ is within the passband of the antenna.

For each of the sensors, the electrical force created in the capacitance is proportional to the square of the voltage across the sensor.

When the modulation frequency $f_m$ is equal to the mechanical resonance frequency of one of the sensors, the force generated has the form:

$$F_e(t) = \frac{C_0}{2(g_0 - w(r))^2} V_0^2 \left[ \frac{2+M^2}{4} + M \sin(2\pi f_m t) - \frac{M^2}{4} \cos(4\pi f_m t) \right]$$

Where $C_0$ is the capacitance at zero bar, go is the cavity thickness, w(r) is the deflection of a point r of the membrane radius due to pressure, $V_0$ is the voltage across the equivalent electrical circuit at zero bar, and M is the modulation index of the signal $S_i$.

By varying the frequency $f_m$ over the frequency range $[f_c(0,T); f_c(1,T)]$, a maximum of the variation of the power of the backscattered signal is obtained at two distinct frequency values, corresponding to the respective resonant frequencies, i.e. the first resonance frequency $F_1=f_c(P,T)$ of the first pressure sensor and the second resonance frequency $F_2=f_{ref}(0,T)$ of the second sensor (reference sensor).

Figure 7:
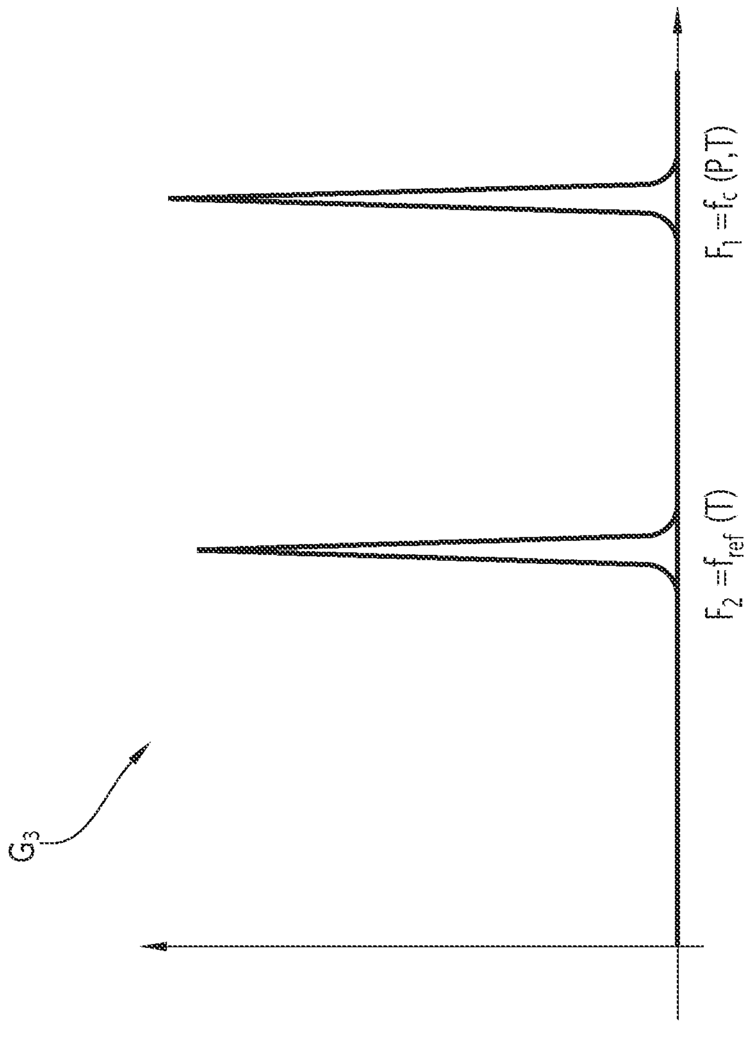
FIG. 7 represents a graph of variation of the power of the modulation of the backscattered signal received according to the resonant frequencies specific to the resonant MEMS components in the first embodiment of the electronic component.

The variation of the power of the backscattered electromagnetic signal $S_r$ as a function of frequency is illustrated in graph $G_3$ shown in FIG. 7, wherein the y-axis represents the power of the backscattered electromagnetic signal and the x-axis represents the frequency.

In the example shown in FIG. 7, the resonance frequency of the second sensor (reference resonance frequency) $F_2$ is lower than the first resonance frequency $F_1$ of the first pressure sensor.

The second resonant frequency (or reference resonant frequency) provides information on the temperature of the environment wherein the electronic component is placed.

By taking into account the first resonant frequency of the first sensor and of the reference resonant frequency together, a more accurate evaluation of the pressure can be obtained, taking temperature into account.

For example, the reference sensor is characterized beforehand in terms of temperature, and the change of the mechanical resonance frequency with temperature is stored.

Moreover, advantageously, two physical quantity measurements are obtained, a temperature measurement and a pressure measurement.

Figure 8:
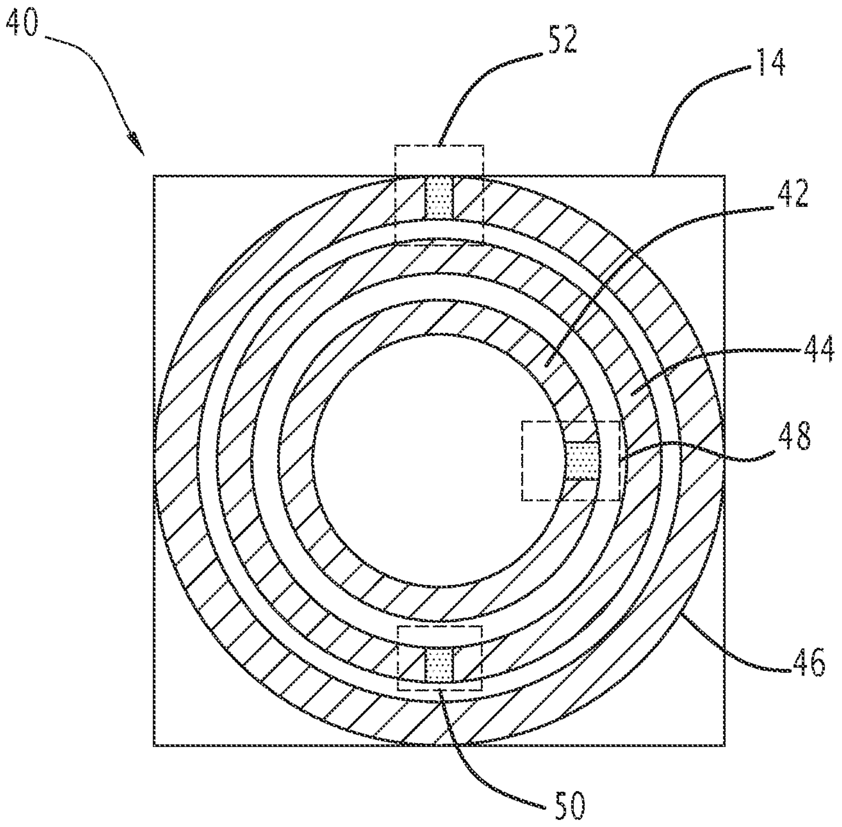
FIG. 8 schematically shows a second embodiment of the electronic component.

FIG. 8 illustrates a second embodiment of an electronic component 40, wherein the electronic component includes three resonant MEMS components with non-linear actuation, and more particularly, three circular membrane capacitive MEMS sensors.

Similarly to FIG. 2, FIG. 8 shows a schematic bottom view of the electronic component 40.

In the second embodiment, the electronic component 40 comprises a planar antenna 14 including three nested loops.

The component 40 includes three antenna loops 42, 44, 46, each comprising a MEMS component 48, 50, 52, the MEMS components being e.g. capacitive MEMS sensors.

For example, the component 40 includes a first capacitive MEMS sensor 48 for measuring relative humidity, a second capacitive MEMS sensor 50 for measuring temperature, and a third capacitive MEMS sensor 52 for measuring pressure.

In the second embodiment, each capacitive MEMS sensor is connected at a distinct contact point to the antenna 14, on a distinct antenna loop.

Each of the capacitive MEMS sensors is connected, in one embodiment, similarly to the connection illustrated in FIG. 3.

Figure 9:
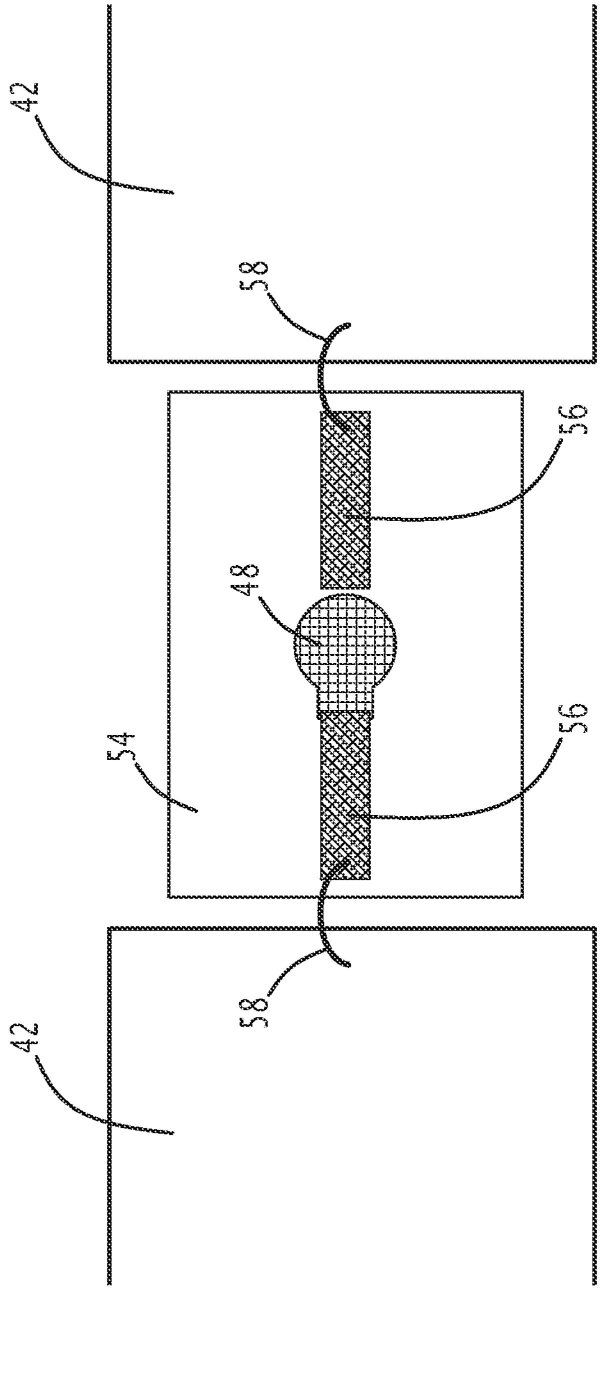
FIG. 9 schematically represents a section of a part from FIG. 8 illustrating a MEMS component and the connection thereof to an antenna element.

FIG. 9 illustrates the connection of the MEMS sensor 48 to the antenna loop 42 in the embodiment shown in FIG. 8, the connection of the other MEMS sensors 50, 52 to the other antenna loops being similar.

A MEMS component 48, on a substrate 54, is connected to an antenna element 42 via conductive tracks 56, and wire bonding 58.

According to a variant, the first, the second and the third capacitive MEMS sensors 48, 50, 52 are e.g. connected in parallel or in series to the same point of contact of the antenna 14.

Similarly, each of the capacitive MEMS sensors has a resonant frequency belonging to a resonant frequency range, the resonant frequency ranges of three sensors being disjoint.

Thereby, three distinct physical quantities are measurable, by applying the measurement method described hereinabove with reference to FIG. 2, e.g. temperature, relative humidity and pressure.

Of course, temperature, relative humidity and pressure are examples of measurable physical quantities, the invention being applicable in a similar manner to the measurement of other physical quantities.

In one embodiment, the antenna 14 is produced by printing on a substrate using a printed circuit manufacturing technology, and each MEMS component is produced on a silicon substrate.

In another embodiment, the antenna 14 and the plurality of capacitive MEMS sensors are implanted on the same substrate, e.g. a silicon substrate, using technologies for manufacturing micro-systems. The connection between each capacitive MEMS sensor and the antenna is then made with conductive tracks.

Figure 10:
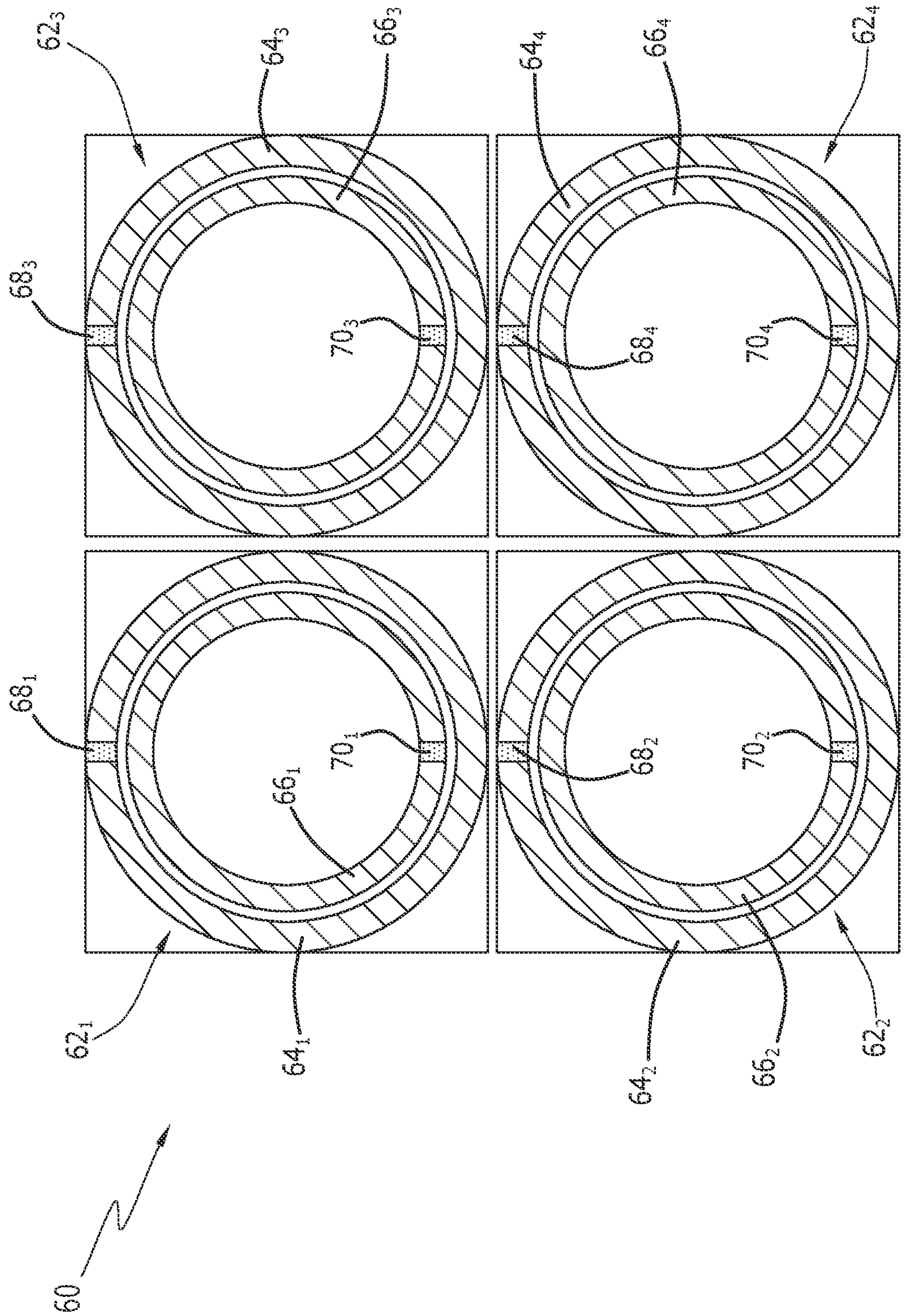
FIG. 10 shows a third embodiment of an electronic component.

FIG. 10 shows an example of a third embodiment of a passive wireless electronic component 60, shown in a "top" view.

In said so-called antenna array embodiment, the electronic component includes N antennas, N=4 in the example shown, referenced by $\mathbf{62}_1$, $\mathbf{62}_2$, $\mathbf{62}_3$, $\mathbf{62}_4$, the generic reference $\mathbf{62}_i$ being used for indicating any of said antennas.

Each antenna $\mathbf{62}_i$ including two nested loops $\mathbf{64}_i$, $\mathbf{66}_i$, and two distinct resonant MEMS components, respectively $\mathbf{68}_i$, $\mathbf{70}_i$, each respective MEMS component being connected to one of the antenna loops and having a natural resonant frequency, belonging to a range of resonant frequencies, the ranges of resonant frequencies being disjoint for two distinct resonant MEMS components $\mathbf{68}_i$, $\mathbf{70}_i$.

In the third embodiment, each antenna $\mathbf{62}_i$ has a natural antenna frequency Fa_i thereof, the resonant frequencies of two distinct antennas being strictly different.

In such a case, the reading, e.g. the detection of the resonance of a given resonant MEMS component $\mathbf{64}_i$, $\mathbf{66}_i$, is done by using the resonant frequency of the antenna Fa_i and the natural resonant frequency F1_i, F2_i thereof.

Since the antenna frequencies Fa_i are all distinct, it is possible to provide, in a variant, resonant MEMS components of the same resonant frequencies associated with distinct antennas, i.e. F1_i=F1_j and F2_i=F2_j for i different from j.

The third embodiment is particularly suitable, using resonant MEMS sensors, for the investigating the localized variations of the same physical quantities on a surface.

In one variant, the resonant MEMS components of the third embodiment are capacitively actuated MEMS resonators, the resonance of one of the resonators being used for identifying the associated antenna.

The embodiments of the invention given hereinabove as an example, include a planar antenna with nested loops.

In a variant, other types of antenna can be used, more particularly planar antennas having a different geometry, e.g. patch or dipole, or a non-planar antenna, e.g. a horn antenna.

The invention was described with vibrating membrane resonant MEMS components. In a variant, other types of resonant MEMS components can be used, e.g. with vibrating beam.

Thereby, according to a variant, resonant MEMS components of various geometries, e.g. with vibrating membrane and vibrating beam, are integrated into the same antenna.

According to another variant, the non-linearity of vibration of the MEMS component is obtained by an external component, e.g. a diode.

Advantageously, an electronic component according to the invention is remotely powered and has a reduced overall size, while being used for the measurement of a plurality of physical quantities and/or an improvement in the accuracy of the measurement of one or a plurality of the physical quantities measured.

The invention claimed is:

1. A passive wireless electronic component including at least one antenna, the or each antenna having an associated antenna frequency, and comprising at least one resonant micro-electromechanical component having a resonant frequency and connected to a contact point of said antenna, forming an antenna-resonator unit suitable for receiving an incident electromagnetic signal including at least two frequencies and to transmit a backscattered electromagnetic signal, wherein the or each antenna includes at least two micro-electromechanical non-linear actuation resonant MEMS components, each of said MEMS components having a natural mechanical resonance frequency belonging to a range of resonance frequencies, the ranges of resonance frequencies associated with two distinct MEMS components being disjoint.

2. The component according to claim 1, including a number N of antennas, N being greater than or equal to two, each antenna including at least two non-linearly actuated resonant MEMS micro-electromechanical components, each antenna having a natural antenna frequency, the antenna frequencies of two distinct antennas being different.

3. The component according to claim 1, wherein at least one of said at least two resonant MEMS components is a capacitive resonator.

4. The component according to claim 1, wherein at least one of said at least two resonant MEMS components is a resonant MEMS sensor the resonant frequency of which varies according to a predetermined physical quantity.

5. The component according to claim 4, wherein said predetermined physical quantity is a physical quantity characteristic of an environment of the resonant MEMS sensor, the physical quantity being one of temperature, air or gas pressure, relative humidity.

6. The component according to claim 4, including a plurality of resonant MEMS sensors, each of said resonant MEMS sensors having a resonant frequency varying according to a distinct physical quantity, said passive electronic component being suitable for providing measurements of a plurality of distinct physical quantities.

7. The component according to claim 4, including at least one pair of first and second resonant MEMS components, the first MEMS component being a resonant MEMS sensor, the resonant frequency of which varies according to a first physical quantity to be measured and according to at least a second physical quantity, the second MEMS component of said pair being a resonant MEMS sensor, the resonant frequency of which does not vary according to said first physical quantity, the resonant frequency of the second sensor varying according to said at least one second physical quantity.

8. The component according to claim 1, wherein said at least two resonant MEMS components are connected in series or in parallel.

9. The component according to claim 1, wherein said at least one antenna is produced as a printed circuit on a substrate and said MEMS components are produced on one or a plurality of silicon chips, each MEMS component being connected to an antenna element by wire bonding.

10. The component according to claim 1, wherein said antenna and said at least two resonant MEMS components are implanted on a same silicon substrate.

11. The component according to claim 9, wherein each resonant MEMS component consists of a membrane positioned between two electrodes, with circular shape and having an associated radius.

12. A reading system of a passive electronic component, including a passive electronic component according to claim 1 and an electromagnetic signal transmitting and analyzing device configured for transmitting said incident electromagnetic signal to the passive electronic component and for receiving and analyzing the backscattered electromagnetic signal.

13. The system according to claim 12, wherein said transmission and analysis device includes a module generating an electrical signal and an antenna for transmitting and reading an incident electromagnetic signal, the transmission and reading antenna being further suitable for receiving the electromagnetic signal backscattered by the antenna of the passive electronic component, the transmission and analysis device further including a signal processing module configured for analyzing the frequency characteristics of the backscattered electromagnetic signal.

* * * * *